(12) United States Patent
Perez Sanchez

(10) Patent No.: US 6,494,144 B1
(45) Date of Patent: Dec. 17, 2002

(54) ENERGY TRANSFER ASSEMBLY

(76) Inventor: Antonio M. Perez Sanchez, 19801 SW. 110$^{th}$ Ct. #108, Miami, FL (US) 33157

( * ) Notice: Subject to any disclaimer, the term of this patent is extended or adjusted under 35 U.S.C. 154(b) by 0 days.

(21) Appl. No.: 10/026,195

(22) Filed: Dec. 21, 2001

(51) Int. Cl.$^7$ ................................................ B60L 11/00
(52) U.S. Cl. ...................................................... 104/287
(58) Field of Search ............................ 104/287; 105/35, 105/36; 318/40; 290/1 R, 1 C, 1 D, 1 A

(56) References Cited

U.S. PATENT DOCUMENTS

| | | | | |
|---|---|---|---|---|
| 1,312,131 A | * | 8/1919 | Morton | 290/1 R |
| 1,916,873 A | * | 7/1933 | Wiggins | 185/27 |
| 4,238,687 A | * | 12/1980 | Martinez | 290/1 R |
| 4,239,975 A | * | 12/1980 | Chiappetti | 290/1 R |
| 4,739,179 A | * | 4/1988 | Stites | 290/1 R |
| 6,353,270 B1 | * | 3/2002 | Sen | 290/1 A |

* cited by examiner

*Primary Examiner*—S. Joseph Morano
*Assistant Examiner*—Frantz F. Jules
(74) *Attorney, Agent, or Firm*—Malloy & Malloy, P.A.

(57) ABSTRACT

An improved, energy transfer assembly utilizing the available mechanical or kinetic energy of a moving vehicle, such as a train, for conversion into usable electric power. The assembly includes a plurality of pairs of impact members operatively positioned along a generally circular, substantially closed loop railway track system. Each pair of impact members is movably interconnected to a corresponding lever assembly, which is subsequently movably interconnected to a gear assembly by one of a plurality of drive arms. Each drive arm is structured to cause the rotation of a primary auxiliary gear when the corresponding pair of impact plates are contacted by the flanges on the wheels of the train. The primary auxiliary gear is interconnected to a transfer drive gear, through the plurality of gears in the gear assembly, such that rotation of the primary auxiliary gear results in rotation of the transfer drive gear, which is interconnected to a rotational component in a power generator, thereby producing usable electric power.

30 Claims, 6 Drawing Sheets

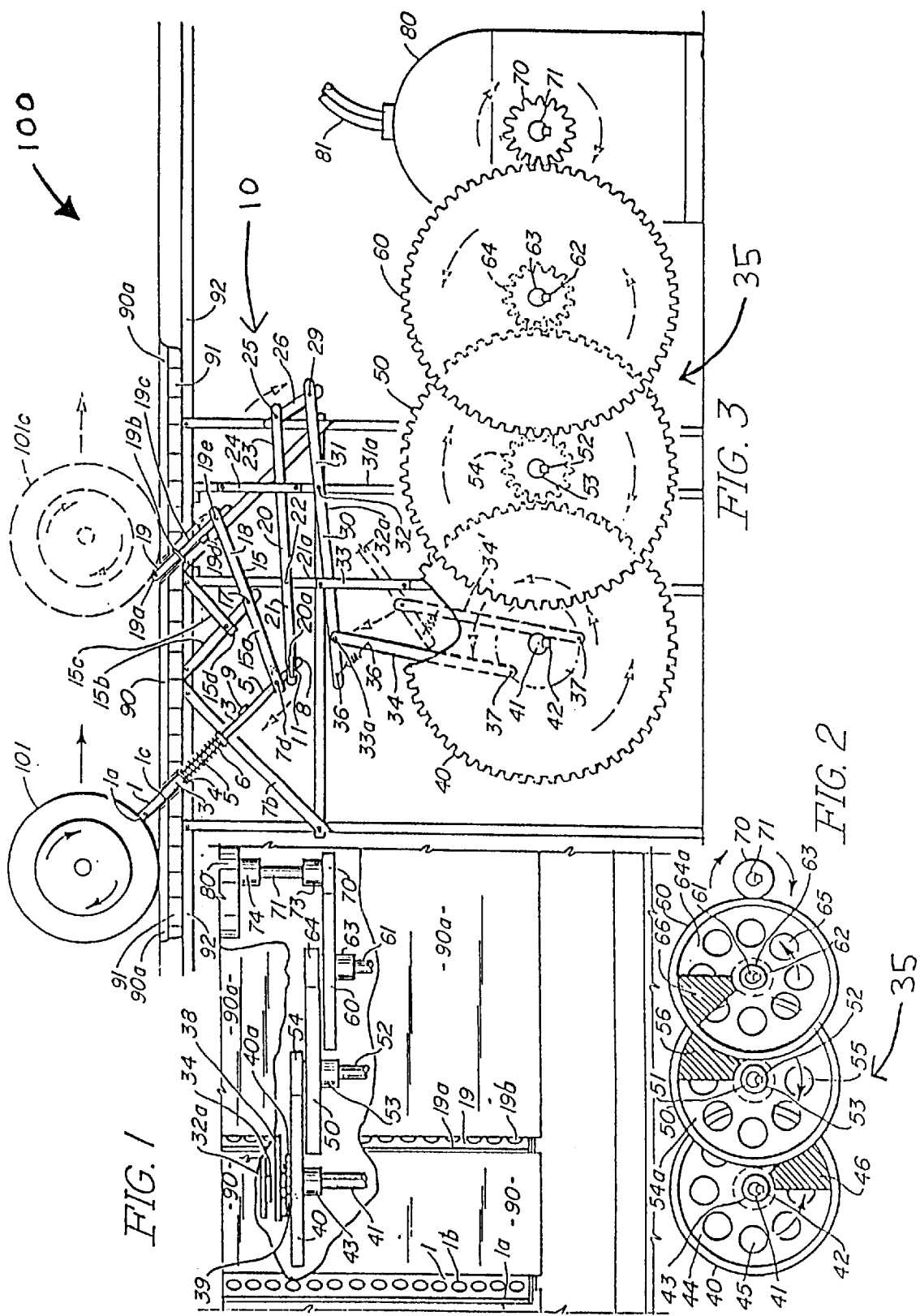

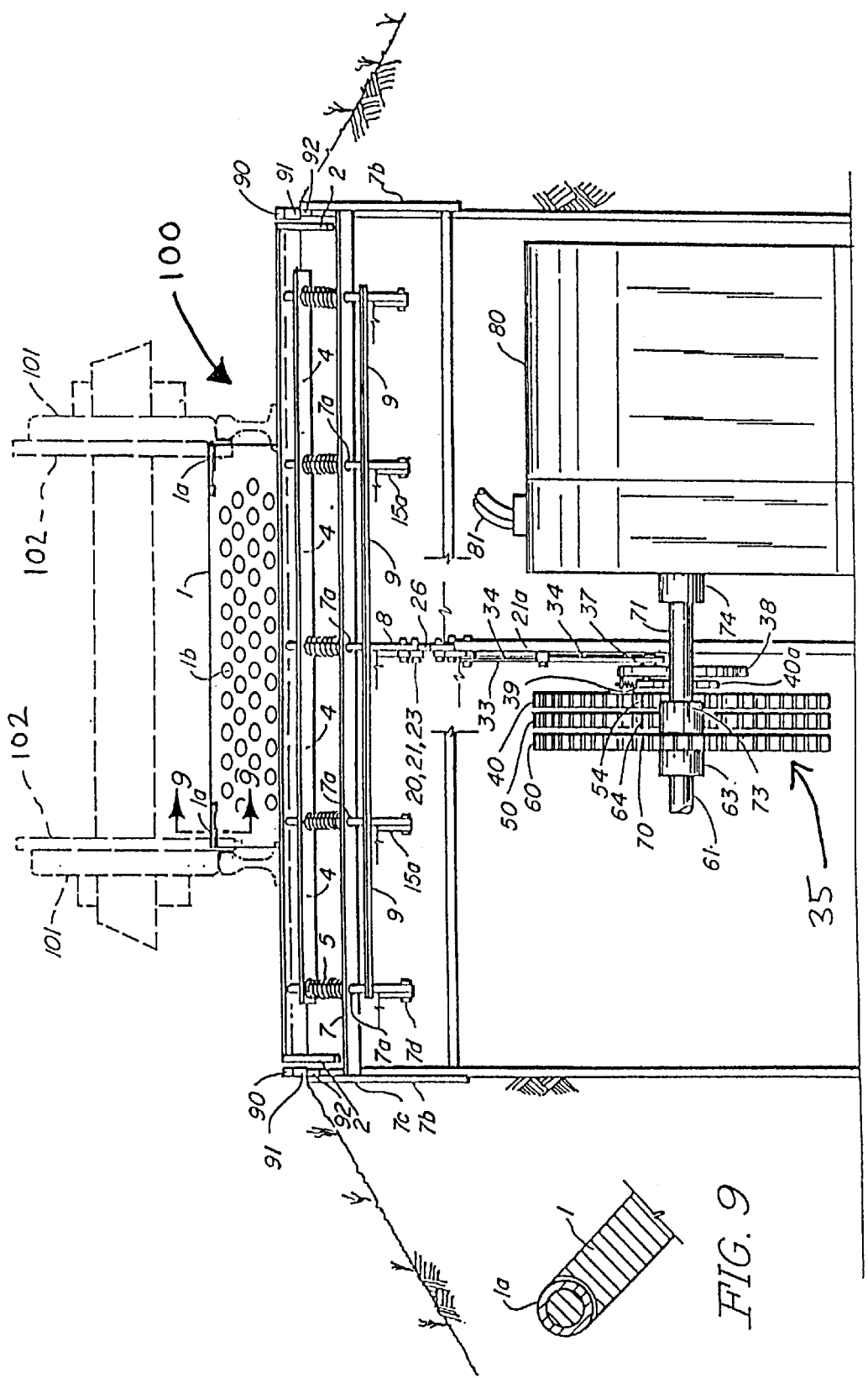

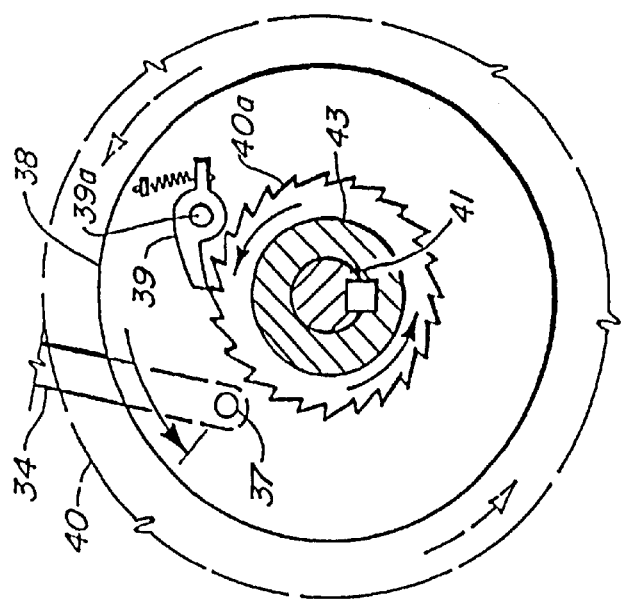
FIG. 8
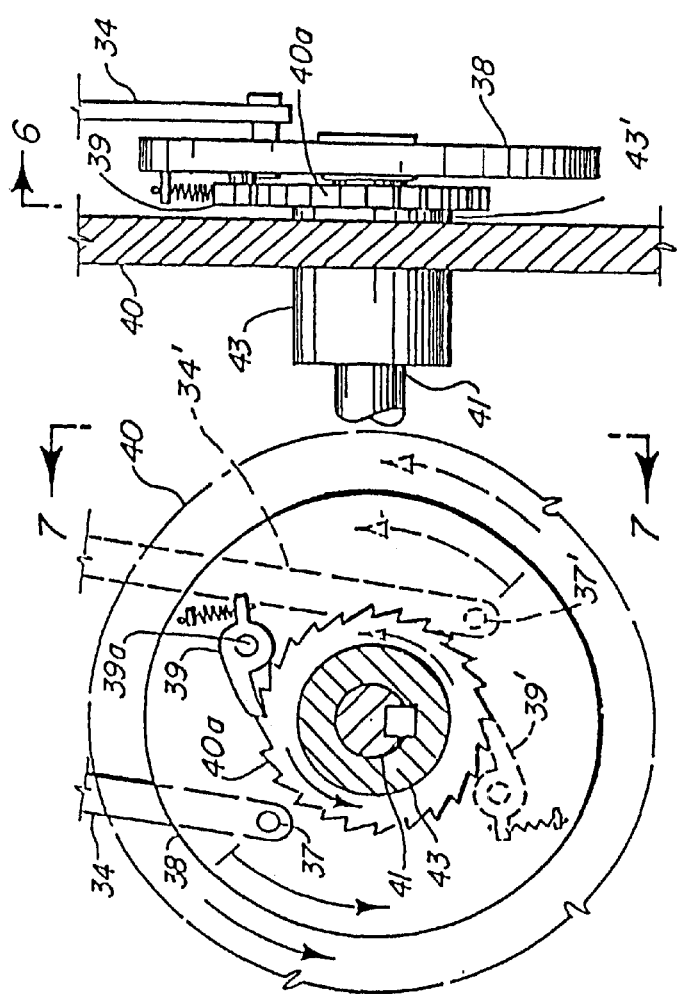
FIG. 7
FIG. 6

ENERGY TRANSFER ASSEMBLY

BACKGROUND OF THE INVENTION

1. Field of the Invention

The present invention relates to an improved assembly to facilitate the transfer of energy, specifically, the transfer of the mechanical or kinetic energy present in a moving vehicle into usable electrical power. This is accomplished utilizing a plurality of vehicles traveling on a substantially closed loop track system, wherein the track is structured to include impact members to absorb the kinetic energy from the vehicles, and lever and gear assemblies to transfer the kinetic energy to a power generator, such as a conventional electrical power generator.

2. Description of the Related Art

With the drastic and continued increase in world population, and the attendant increases in industrialization, there is an ever increasing demand for conventional fuels, such as fossil fuels. The result is the diminishment of the world fossil fuel supply resulting in shortages and continuously rising prices which have occurred in numerous industrialized nations. Although such conventional fuels are still the primary source of energy for driving conventional power generating assemblies, such as electrical power generators, there is an ever increasing demand for alternative energy sources which would effectively reduce the demand for fossil fuel and which would also be less detrimental to the environment than conventional.

Among the recognized alternative energy sources are nuclear energy and solar energy. Nuclear energy, while effective for driving conventional electrical power generators and similar power generating devices, is known to be dangerous and extremely expensive. As a result of recent accidents resulting in death to inhabitants in the vicinity surrounding nuclear power facilities, nuclear energy has become a less and less desirable alternative.

Solar energy, on the other hand, while considered to be a clean and safe alternative source of energy, has recognized disadvantages related to efficiency. As a result, utilization of solar energy has not been generally accepted for use in industrial applications or wide spread, high capacity electrical power generation.

As such, there is still an increasing demand for an alternate energy source which is efficient for driving relatively large scale, high capacity electrical generators and similar devices, and is capable of providing electrical power for both domestic and industrial facilities in densely populated areas. One area which has generally been overlooked is the utilization of mechanical energy, specifically, the kinetic energy available in moving vehicles, such as moving trains, which are plentiful throughout the United States as well as most industrialized countries of the world and are capable of being used to drive electrical generators or similar power generating devices, thereby effectively transferring their kinetic energy into usable electrical power, without the disadvantages and threats to public health and safety or to the environment, which are inherent in conventional power generating assemblies.

SUMMARY OF THE INVENTION

The present invention is directed to an improved energy transfer assembly, which allows the efficient transfer of mechanical or kinetic energy into electrical energy. The improved energy transfer assembly utilizes a generally circular track system preferably comprising a substantially closed loop configuration, along which one or more wheeled vehicles may travel, such as conventional locomotive engines and railcars. At least one pair of impact members, each including a first impact member and a second impact member, are operatively positioned along the track system, and each of the impact members are alternately movable between an extended position and a retracted position upon contact with a flange of a wheel of the vehicle(s) traveling along the track system. In one embodiment of the present invention, a plurality of pairs of impact members are operatively positioned along the track system.

The present invention further incorporates one or more lever assemblies, each interconnected to a pair of impact members such that the impact plates are in driving engagement with the corresponding lever assembly. Each lever assembly is subsequently interconnected with and operates in cooperative engagement with a corresponding gear assembly. The cooperative association between each lever assembly and the corresponding gear assembly is structured such that a drive arm, which movably interconnects the lever assembly to a primary auxiliary gear of the gear assembly, causes movement of the primary auxiliary gear.

In one embodiment of the present invention, each gear assembly includes a plurality of auxiliary gears each associated with a corresponding drive gear. In addition, each gear assembly includes a corresponding transfer drive gear, which is structured to effect the movement of a rotational component of a power generator. As a result of the movement of the rotational component, each power generator of the present invention produces usable electrical power, which may be transferred to any one of a number of remote locations via a plurality of conductor cables.

The continuous movement of the locomotives and railcars around the circular track system of the present invention may transfer enough kinetic energy to power potentially hundreds of large electrical generators, for example, 1,000,000 kilowatts, each of which can provide electrical energy to many inhabitants in numerous cities either at a very low cost, or perhaps, at no cost.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 1 is a top view in partial cutaway of a gear assembly and impact members of the present invention.

FIG. 2 is a side view of a portion of the gear assembly of the present invention.

FIG. 3 is a side view and partial phantom of operative components of the present invention as a flange on a wheel of a vehicle contact the impact members associated therewith.

FIG. 5 is a front view in partial section and cutaway showing the operation of various components of one preferred embodiment of the present invention.

FIG. 6 is a side view showing details of certain components of the gear assembly of the present invention taken along line 6—6 of FIG. 7.

FIG. 7 is an end view taken along line 7—7 of FIG. 6.

FIG. 8 is a sectional view similar of that of FIG. 6 showing different positions of the various components thereof.

FIG. 9 is a sectional view in partial cutaway showing details of each of the impact members taken along line 9—9 of FIG. 5.

Like reference numerals refer to like parts throughout the several views of the drawings.

DETAILED DESCRIPTION OF THE PREFERRED EMBODIMENT

Figure 4:
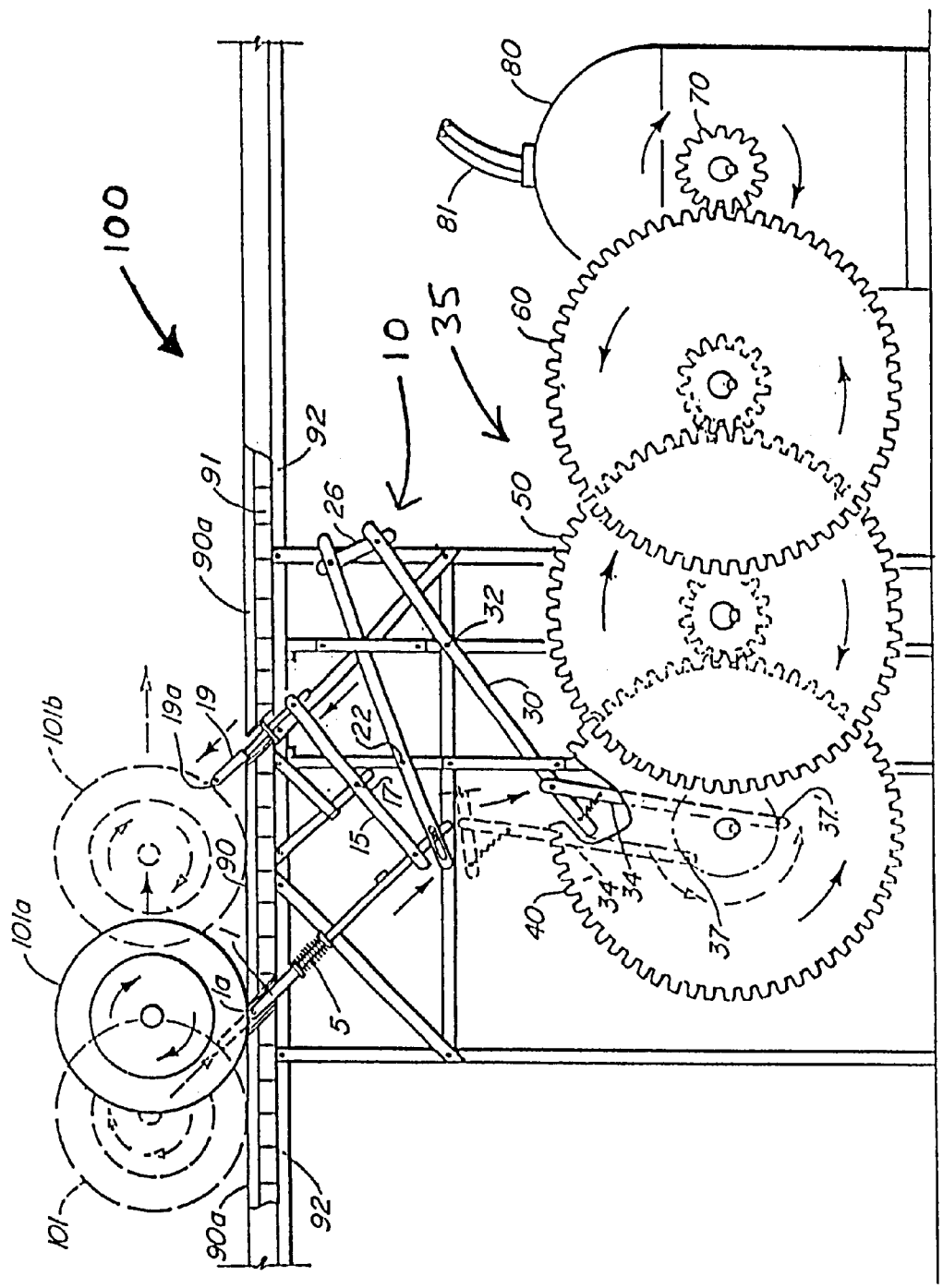
FIG. 4 is a side view similar to the embodiment of FIG. 3 wherein the flange of the wheel of the vehicle contacts different impact members at different locations.
Figure 10:
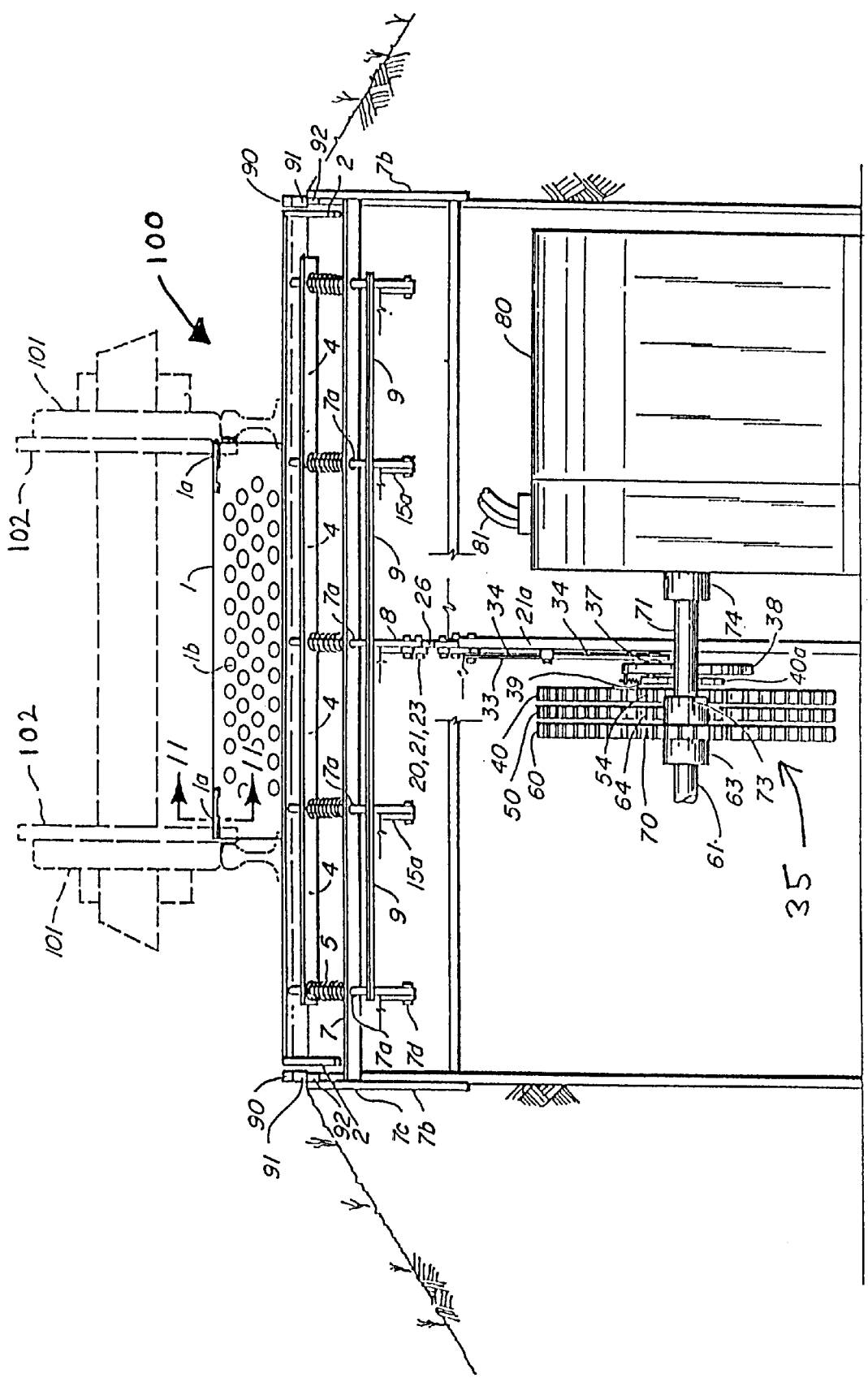
FIG. 10 is a front view of another preferred embodiment of the present invention utilizing a locomotive engine(s) and/or railcars as the moving vehicle shown in partial section and cutaway demonstrating the operation of various components of the present invention in association with the vehicle.

While this invention is susceptible of embodiment in many different forms, there is shown in the drawings and will herein be described in further detail, including specific dimensional features of at least one most preferred embodiment, with the understanding that the present disclosure is to be considered as an exemplification of the present invention and is not intended to limit the scope of embodiments encompassed by the present invention to the specific embodiments described and illustrated herein.

Figure 11:
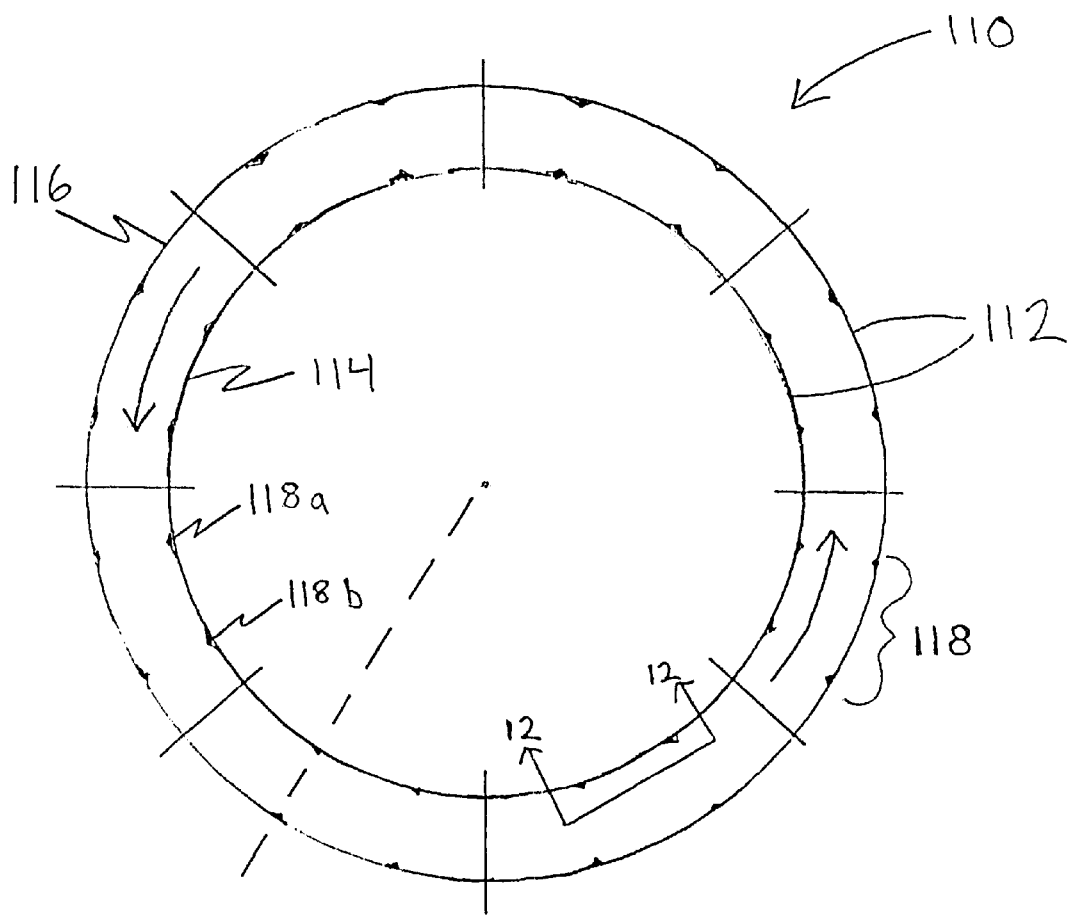
FIG. 11 is a schematic representation of one preferred embodiment of a generally circular, substantially closed loop railway track system of the present invention illustrating the relative locations of a plurality of pairs of grooves.

The present invention is directed to an improved energy transfer assembly, generally shown as 100 throughout the Figures. The assembly 100 includes a track system 110, which preferably has a generally circular closed loop configuration, as illustrated in FIG. 11, upon which one or more wheeled vehicles travel. In one preferred embodiment of the present invention, the track system 110 includes parallel rails 112, including a plurality of inner rails 114 and a plurality of outer rails 116, such as are commonly used for commercial locomotive engines and the various railcars they transport.

Figure 12:
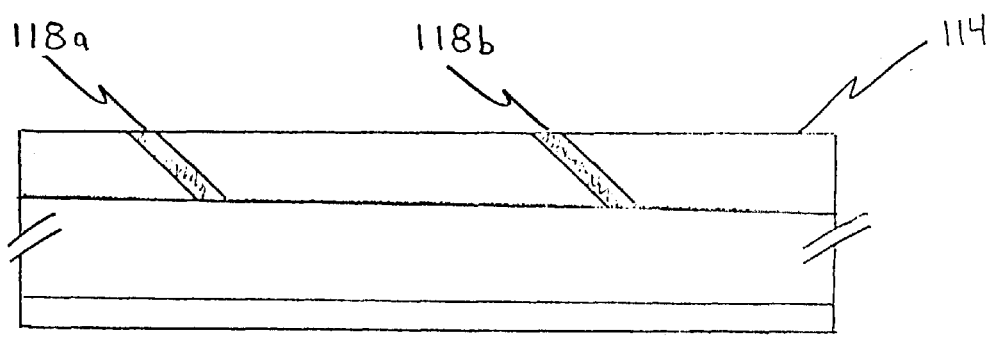
FIG. 12 is a side view of the pair of grooves in a portion of one of the rails of the railway track system along line 12—12 of FIG. 11.

As illustrated in FIGS. 11 and 12, each of the plurality of inner rails 114 and outer rails 116 of the present invention include at least one, but preferably a plurality of pairs of grooves 118, which are each oriented at a predetermined angle of preferably 45 degrees into the direction of travel of the wheels 101 of the vehicle(s) traveling along the track system 110, in at least one preferred embodiment of the present invention. As illustrated in FIG. 11, each corresponding pair of grooves 118 in the inner rails 114 and the outer rails 116 are aligned such that a line drawn from the center of the circular closed loop configuration of the track system 110 will intersect each corresponding pair of grooves 118 along the track system 110.

Each of the plurality of pairs of grooves 118 are separated by pavement plates, including a short pavement plate 90 and a long pavement plate 90a. These pavement plates 90 and 90a, as well as certain other components of the present invention, are supported by a supporting plate 91 and supporting beam 92. Other conventional structures may be included such as a concrete curb and/or a gutter.

A preferred embodiment of the present invention includes a generally circular, substantially closed loop railway track system 110 which is preferably structured to facilitate the operation of four locomotive engines each pulling nineteen railcars, and two locomotive engines each pulling eighteen railcars. Preferably, each of the railcars is 55 feet in length, with each of the nineteen railcars having a load weight of two tons, while each of the eighteen railcars has a load weight of three tons. The locomotive engines are electrically powered and will at least initially receive the electrical power they require to operate from an external power source, preferably from a system of overhead wires. However, once the assembly is operational, the locomotive engines will receive their required electrical power from the power generated by the assembly 100. The trains will operate one behind the other at the same speed, preferably controlled by remote control, and at a distance of approximately 40 feet from one another.

As previously indicated, at least one embodiment of the present invention utilizes parallel rails 112. These parallel rails 112 have a preferred gauge of 4 feet and 8.5 inches between the inner rails 114 and the outer rails 116. Preferably, the outer rails 116 form a circle having a circumference of approximately 6,750 feet, thereby requiring approximately 150 rails, each preferably being approximately 45 feet long and 6 inches high. Further, each outer rail 116 preferably includes at least two pairs of grooves 118 in the inside face of the rail, each being 1.5 inches long and ⅝ of an inch deep. The outside face of each outer rail 116 may include a fortifying support at each location which coincides with each pair of grooves 118 in the inside face of each rail 116. Each of the grooves in each pair of grooves 118 preferably has an inclination of 45 degrees facing into the direction of travel of the oncoming trains, with the groove of each pair of grooves 118 closest to the oncoming train being a leading groove 118a and while the other is a trailing groove 118b. The separation between each pair of grooves 118 along the path of each outer rail 116 may be approximately 20 feet and 6 inches, and the separation between each corresponding leading groove 118a and trailing groove 118b is preferably about 2 feet. The pair of grooves 118 near either end of each outer rail 116 are preferably maintained a distance of approximately 10 feet and 1-1/2 inches from either end of each rail 116.

With respect to the inner rails 114, they preferably form a circle having a circumference of 6,720 feet thereby requiring approximately 150 inner rails 114, each preferably being approximately 44 feet and 9.6 inches long and 6 inches high. Each inner rail 114 also preferably has at least two pairs of grooves 118 in the inside face of each inner rail 114, with the separation between the leading groove 118a and the trailing groove 118b in each pair of grooves 118 also being approximately 1 foot and 11⅝ inches. The separation between the pairs of grooves 118 along the inner rails 114 is preferably 20 feet and 7-7/18 inches, and the pairs of grooves 118 near either end of each inner rail 114 are also maintained a distance of approximately 10 feet and 1 inch from each end.

Each inner rail 114 and outer rail 116 is preferably constructed of steel and has a curvature of 2.4 degrees. The generally circular closed loop railway track system 110 is preferably constructed at a height of approximately 10.5 feet above grade to provide enough space below the tracks for the other components of the assembly 100 of the present invention.

Each railcar utilized by the present invention preferably has five pairs of wheels 101, each wheel 101 being 34 inches in diameter and including a flange 102. Each flange 102 is preferably 2 inches wide to provide sufficient contact surface area with a plurality of pairs of impact members, each having a first impact member 1 and a second impact member 19, operatively positioned around the track system 110 in each of the corresponding pair of leading grooves 118a and trailing grooves 118b, respectively, in each of the inner rails 114 and outer rails 116. The separation between each pair of wheels 101 is preferably 11 feet, and the wheels 101 near each end of each railcar are maintained a distance of 5.5 feet from either end, such that each pair of wheels 101 of each railcar that operates on the generally circular closed loop railway track system 110 are preferably maintained at a distance of 11 feet from one another. The distance between each pair of wheels 101 of each As indicated above, the present invention comprises a plurality of pairs of impacts members, each having first and second impact members 1 and 19 operatively positioned in spaced apart relation to one another along the track system 110. Each impact member 1 and 19 is preferably 4 feet and 9 inches long, 4 inches high, and 1 inch thick, constructed of a light weight yet hard material, and having a plate-like configuration with oppositely disposed smooth surfaces. Further, each first and second impact member 1 and 19 includes a plurality of first and second leading rollers, 1a and 19a respectively, formed along the leading longitudinal edge of each member, thus positioned to engage the flange 102 of one of the wheels 101, as noted above. Further, each first and second impact member 1 and 19 is preferably positioned at an approximately 45 degree angle to an outer surface of the track system 110 and into the direction which the wheels 101 of the train(s) travel. This positions each first and second leading roller 1a and 19a in a,substantially perpendicular relation to the oncoming surface of the flange 102 on each wheel 101, to achieve maximum efficiency of operation of the assembly of the present invention upon contact.

Each pair of impact members 1 and 19 are at least partially interconnected to one another by a plurality of minor action levers 15, preferably three in number with each being approximately 21 inches long, 3 inches wide, and ¾ of an inch thick, and constructed of steel. A short arm 15a of each minor action lever 15 is preferably 10.5 inches long while a long arm 18 of each minor action lever 15 is preferably 10.75 inches long having an approximately 2.5 inch wide groove in one end. Each minor lever short arm 15a is preferably interconnected to the first impact member 1 by a corresponding one of a plurality of first minor impact bars 5 which are either 23 or 32 inches long and ⅞ of an inch in diameter, with each also being constructed of steel. The first minor impact bar 5 which is generally positioned near the middle of the first impact member 1 is preferably 32 inches long, while the remaining first minor impact bars 5 are preferably 23 inches long. Each of the first minor action levers 15 are interconnected to one of a plurality of corresponding first major impact bars 8, which ultimately interconnect with one of a plurality of first major action levers 20, as discussed in further detail hereinafter.

Further, each of the plurality of minor action levers 15 is preferably supported on a corresponding one of a plurality of second long support beams 15b, which are interconnected to one of a plurality of corresponding second short support beams 15c. The second long and short support beams 15b and 15c are preferably oriented at opposing 45 degree angles from the underside of the track system 110 and interconnected by one of a plurality of second fixed alignment bars 15d. In one preferred embodiment, one of a plurality first fulcrums 17 movably interconnects each minor action lever 15 to a corresponding one of the plurality of second long support beams 15b. Each of the plurality of minor lever long arms 18 is preferably interconnected to a corresponding one of a plurality of second minor impact bars 19c by one of a plurality of second minor lever pivotal connectors 19e, which allow each first minor action lever 15 to be further positionable based on the movement of each second impact member 19.

Each of the first and second impact members 1 and 19 are disposed to be movable between an extended position, as illustrated by the position of the first impact member 1 in FIG. 3, and a retracted position, as illustrated by the position of the second impact member 19 in FIG. 3. In a preferred embodiment of the present invention, the extended position is at least partially defined by a portion of the first or second impact member 1 and 19 extending outwardly from an outer surface of the rails 112.

It should be apparent from FIGS. 3 and 4 that as the flange 102 of one of the wheels 101 engages each first or second impact member 1 and 19, the impact member will be forced from its extended position to the retracted position, while the other of the first or second impact member 1 and 19 not contacted by the flange 102 will be forced into its opposite, extended position. For example, when the flange 102 contacts the first impact member 1, it will of course be forced downwardly into its retracted position from its extended position, as illustrated by the position of the wheel 101 and the first impact member 1 with wheel 101 at position 101a, in FIG. 4. Further, upon the flange 102 of the wheel 101 contacting the impact member 1 and forcing it into its retracted position, the second impact member 19 will be forced upwardly into its extended position, also as illustrated in FIG. 4. Since the travel of the train will be as indicated by the. directional arrows in FIG. 4, the second impact member 19 will be subsequently contacted by the flange 102 of the wheel 101, as represented by the position of the wheel at 101b. This will then force the second impact member 19 into its retracted position and, accordingly, due to the interconnection of the impact members 1 and 19 by the plurality of minor action levers 15, will force the first impact member 1 back into its extended position. In the extended position, each of the first and second impact members 1 and 19 are ready for contact with the flange 102 of the next oncoming wheel 101.

For purposes of clarity, FIG. 4 represents the various positions of the wheel 101 as it approaches, and as its flange 102 subsequently contacts, each of the first and second impact members 1 and 19. For example, the wheel 101 in a first position illustrates the wheel 101 upon immediate impact of its flange 102 with a first leading roller 1a mounted on a leading edge of the first impact member 1 (see FIG. 9). The position of the wheel 101 at 101a illustrates the first impact member 1 being driven into its retracted position against one of a plurality of compression springs 6. Position 101b shows the position of the wheel 101 immediately upon its flange 102 contacting the second leading roller 19a connected to a leading edge of the second impact member 19. Finally, the position of the wheel 101 at 101c in FIG. 3 illustrates the second impact member 19 being driven into its retracted position.

Other structural features of the first and second impact members 1 and 19 preferably include first and second fixed members, 1c and 19c, respectively, which are provided along with two lateral alignment bars 2 to maintain the impact members 1 and 19 in position in each corresponding pair of grooves 118. The plurality of first minor impact bars 5 preferably serve as an interconnection between a movable spring compression plate 4 and each minor lever short arm 15a. In at least one embodiment of the present invention, the plurality of compression springs 6 serve to bias the first impact member 1 into its extended position. A fixed spring compression plate 7, including a plurality of compression plate apertures 7a, preferably five in number, is connected to the underside of the track system 110 by two first long support beams 7b, which are preferably disposed at a 45 degree angle from the underside of the track system 110.

A preferred embodiment of the assembly 100 of the present invention includes a lever assembly, generally shown as 10 throughout the Figures. The lever assembly 10 includes a plurality of linkage members which serve to provide a movable interconnection between each pair of first and second impact members 1 and 19 and a corresponding gear assembly, generally shown as 35.

As previously noted, the assembly 100 of at least one embodiment of the present invention includes a plurality of first major impact bars 8 each movably interconnected to a corresponding one of the plurality of first major action levers 20. Each first major impact bar 8 is movably interconnected to the corresponding first major action lever 20 by a lever slot connector 20a which is positioned through lever slot 11. In addition, each first major impact bar 8 is preferably movably interconnected to one end of a corresponding one of the plurality of minor action levers 15 by way of a minor lever pivotal connector 7d. This provides a movable, preferably pivotal, interconnection between each pair of first and second impact members 1 and 19 to each corresponding first major action lever 20.

Each first major action lever 20 is preferably movably supported on a first vertical support beam 21a by a corresponding one of a plurality of second fulcrums 22. A first guide plate 24 is provided for each first major action lever long arm 23, and a corresponding one of a plurality of auxiliary levers 26 is preferably movably connected to one end of each first major action lever 20 by a first auxiliary pivotal connector 25.

A preferred embodiment of the assembly 100 of the present invention further includes a plurality of second major action levers 30 each being at least partially and movably supported on a corresponding one of a plurality a second vertical support beam 31a by one of a plurality of third fulcrums 32. Further, a second guide plate 33 is provided for a second major lever long arm 32a on each of the plurality of second major action levers 30. Each second major action lever 30 also includes a second major lever short arm 31 which is preferably movably interconnected to a corresponding one of the plurality of auxiliary levers 26 by a second auxiliary pivotal connector 29.

The opposite end of each of the plurality of second major action levers 30 is preferably movably interconnected to a corresponding one of a plurality of drive arms 34. In a preferred embodiment, each drive arm 34 has an elongated configuration with one end interconnected to the end of the long arm 32a of the corresponding second major action lever 30 by a first drive arm pivotal connector 33a, and an opposite end of each drive arm 34 interconnected to a corresponding one of a plurality of auxiliary gears 38 by a second drive arm pivotal connector 37. Additionally, each drive arm 34 is preferably interconnected to its corresponding second major action lever 30 by one of a plurality of drive arm springs 36, which serve to bias each drive arm 34 into an upstroke orientation, as discussed in further detail below. Each drive arm spring 36 is preferably 2.5 inches long and ⅜ of an inch in diameter, and serves to at least partially pull the drive arm 34 through the last third of a cycle along a circular path of rotation of a corresponding one of a plurality of primary auxiliary gears 38, thereby maintaining the gear 38 in the best position to rotate forward each time the flange 102 of one of the wheels 101 contacts the corresponding pair of first and second impact members 1 and 19. Preferably, a delay of a fraction of a second occurs between the contact of the flange 102 with the first impact member 1 and, subsequently, the second impact member 19, and in this fraction of a second, each drive arm spring 36 assists in positioning its corresponding primary auxiliary gear 38 into an optimum position to rotate forward when a subsequent flange 102 contacts the corresponding first and second impact members 1 and 19.

The assembly 100 of the present invention further preferably includes a pawl and ratchet assembly including a spring biased pawl 39 mounted on each of the plurality of primary auxiliary gears 38 about a pawl pivot point 39a, which allows the pawl 39 to rotate with the gear 38, and about the pivot point 39a, as illustrated in FIGS. 6, 7, and 8. Each spring biased pawl 39 cooperatively associates with a ratchet assembly 40a, which is preferably mounted to a primary drive gear 40. In a preferred embodiment, a primary hub 43 serves to interconnect the rachet assembly 40a and the primary drive gear 40 such that rotation of these components is coincident and in the same direction. The cooperative association of each spring biased pawl 39 and its corresponding ratchet assembly 40a is such as to allow forced rotation of the primary drive gear 40 in only one direction, as indicated by the directional arrows in FIGS. 6 and 8. Further, rotation of the ratchet assembly 40a as well as the primary drive gear 40 may still occur even when the drive arm 34 is not driving the primary auxiliary gear 38 as a result of the cooperative association of the spring biased pawl 39 and the rachet assembly 40a. The position of the drive arm 34 and the second drive arm pivotal connector 37 in the upstroke orientation are shown in solid lines in FIG. 6, while a downstroke orientation of the drive arm 34 and the second drive arm pivotal connector 37, as well as the spring biased pawl 39', are shown in phantom by dashed lines. The primary drive gear 40 is preferably attached to a primary shaft 41 by a primary key member 42.

In at least one embodiment of the assembly 100 of the present invention, the gear assembly 35 comprises a plurality of gear pairs, each including an auxiliary gear and a drive gear. For example, in a preferred embodiment, the outer periphery of each primary drive gear 40 is disposed in meshing and driving engagement with a corresponding one of plurality of secondary auxiliary gears 54 which is interconnected to a corresponding secondary drive gear 50, such that the secondary drive gear 50 is rotatable with and in the same direction as the corresponding secondary auxiliary gear 54. Similar to the primary drive gears 40, each secondary drive gear 50 includes a secondary hub 53 and is attached to a secondary shaft 51 by a secondary key 52. Further, the outer periphery of each secondary drive gear 50 is disposed in meshing and driving engagement with a corresponding one of a plurality of tertiary auxiliary gears 64 which is interconnected to a corresponding tertiary drive gear 60, such that the tertiary drive gear 60 is rotatable with and in the same direction as the corresponding tertiary auxiliary gear 64. The tertiary drive gear 60 also includes a tertiary hub 63 and is attached to a tertiary shaft 61 by a tertiary key 62. The gear ratio between each corresponding pair of auxiliary and drive gears is preferably 4 to 1.

Further, as illustrated in FIG. 2, each of the plurality of drive gears 40, 50, and 60 preferably include a thin wall portion 44, 54a, and 64a, respectively, comprising an approximately 315 degree sector of its surface area. Each of the thin wall portions 44, 54a, and 64a, further include a plurality of drive gear apertures 45, 55, and 65, respectively, integrally formed therein. In addition, each of the drive gears 40, 50, and 60 include a solid, preferably weighted, portion 46, 56, and 66, respectively, comprising an approximately 45 degree sector of their surface area, as illustrated in FIG. 2. The combination of drive gear apertures 45, 55, and 65 are preferably arranged in a suitable counter balancing arrangement with the weighted portions 46, 56, and 66, as illustrated in FIG. 2, to maximize the acceleration and rotation of a corresponding one of a plurality of transfer drive gears 70, and, ultimately, a rotatable component of a corresponding power generator 80.

In a preferred embodiment, the outer periphery of each of the plurality of tertiary drive gears 60 is disposed in meshing and driving engagement with the corresponding one of the plurality of transfer drive gears 70, which are interconnected to the rotatable component of the corresponding power generator 80 by a transfer drive shaft 71 and first and second transfer hubs 73 and 74. Each rotatable component, for example, a rotor, is preferably structured to rotate with the corresponding transfer drive gear 70, and may be associated with a fixed component, for example, a stator within the corresponding power generator 80, thereby generating usable electrical power, which may be transferred to one of a plurality of remote locations by way of a corresponding one of a plurality of conductor cables 81.

Having described the components of at least one preferred embodiment of the assembly 100 of the present invention, the following is a description of the interaction of the various components in the generation of usable electrical power. As an initial matter, the improved energy transfer assembly 100 includes a generally circular, substantially closed loop railway track system 110 structured to permit travel of a plurality of wheeled vehicles, preferably a plurality of locomotive engines, each transporting a plurality of railcars. The assembly 100 further includes a plurality of pairs of first and second impact members 1 and 19 interconnected with one another by a series of minor action levers 15. Each pair of first and second impact members 1 and 19 are operatively positioned in spaced apart relation along the track system 110 at a distance such that the flange 102 of one the wheels 101 cannot concurrently or simultaneously contact the first and second impact members 1 and 19. Further, each first and second impact member 1 and 19 extend outwardly from the outer surface of the rails 112 and are preferably oriented at an inclination of 45 degrees into the direction of travel of the oncoming trains, when in their extended orientation. Thus, the leading and trailing grooves 118a and 118b through which each first and second impact members 1 and 19 pass through, respectively, are also spaced apart along the track system 110, and are preferably oriented at an angle of approximately 45 degrees into the direction of travel of the oncoming trains.

The interaction of each pair of first and second impact members 1 and 19 upon contact with the flanges 102 of the wheels 101 of the train will of course be a push/pull type of action, as a result of their interconnection by the series of minor action levers 15. Each minor action lever 15 has a minor lever short arm 15a interconnected to each first impact member 1 by one of a plurality of first minor impact bars 5. Further, each minor action lever 15 has a minor lever long arm 18 interconnected to its corresponding second impact member 19 by one of the plurality of second minor impact bars 19c. More specifically, the first and second impact members 1 and 19 are interconnected such that when the first impact member 1 is forced downwardly into the retracted position upon contact with the flange 102 of the wheel 101, the minor lever short arms 15a are forced downward at a 45 degree angle from the underside of the track system 110. Simultaneously, each minor lever long arm 18 is forced upwardly at a 45 degree angle which results in the second impact member 19 being forced into the extended position into the path of travel of the oncoming train, as illustrated in FIG. 4.

Additionally, each minor lever short arm 15a is interconnected to the corresponding first major lever short arm 21 by the first major impact bar 8, such that the movement of the minor action lever 15 results in a corresponding movement of the first major action lever 20. Each first major lever long arm 23 is movably interconnected to the corresponding one of the plurality of second major lever short arms 31 by the auxiliary lever 26 by first and second auxiliary connectors 24 and 26, respectively. Further, each second major lever long arm 32a is interconnected to the corresponding one of the plurality of drive arms 34 which is subsequently movably interconnected to the corresponding primary auxiliary gear 38. As such, the "push/pull" action of each pair of first and second impact members 1 and 19 results in the driving movement of the corresponding primary auxiliary gear 38, through the movably interconnected configuration of each pair of impact members 1 and 19 with the corresponding lever assembly 10, which ultimately results in rotation of the corresponding transfer drive gear 70 through the interconnection of the drive arm 34 with the corresponding gear assembly 35. Accordingly, the mechanical or kinetic energy of each train traveling along the generally circular, substantially closed loop railway track system 110, which is based in part on each train's weight and speed, is ultimately transferred in part to the plurality of power generators 80, by its corresponding transfer drive gear 70, following contact and driving engagement with each corresponding pair of first and second impact members 1 and 19.

The first and second major action levers 20 and 30 receive almost all of the kinetic energy of each train's weight and speed by means of the first major impact bar 8 which movably interconnects the first impact member 1 with the corresponding minor action lever 15 and first major action lever 20. Each minor lever short arm 15a and each first major lever short arm 21 are forced downwardly when the flanges 102 of the wheels 101 of the train contact the corresponding first impact member 1, and simultaneously, the corresponding minor lever long arm 18 and first major lever long arm 23 are forced upwardly, forcing the corresponding second impact member 19 into its extended position. In addition, this forces the corresponding second major lever long arm 32a downward, thereby causing drive arm 34 to drive the corresponding primary auxiliary gear 38 along approximately 180 degrees of its circular rotation.

After passing beyond the first impact member 1, the flanges 102 of the wheels 101 reach the corresponding second impact member 19, which is now in its extended position. Upon contact with the flanges 102, the second impact member 19, and the interaction of the corresponding lever assembly 10, serves to effectively pull the primary auxiliary gear 38 through the remaining 180 degrees of its circular rotation. Each rotation of the primary auxiliary gear 38 serves to rotate the primary drive gear 40 one time, which ultimately generates 64 revolutions of the corresponding transfer gear 70, in this preferred embodiment of the present invention. Thus, if the train's speed is 30 miles per hour, the train will travel approximately 44 feet per second, thereby allowing the flanges 102 of the wheels 101 to contact each pair of first and second impact members 1 and 19 approximately five times per second. With the resultant number of revolutions of the corresponding transfer drive gear 70, approximately 320 revolutions per second, each electrical power generator 80 is operated efficiently. Further, the mechanical or kinetic energy of each train, which is transmitted to each of the plurality of power generators 80 through the corresponding lever assembly 10 and gear assembly 35, is more than enough to operate the electrical power generators 80 in a manner which will render the assembly 100 of the present invention commercially feasible.

Since many modifications, variations and changes in detail can be made to the described preferred embodiment of the invention, in particular with respect to the specific dimensions of the various components described herein, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An improved energy transfer assembly comprising:
   at least one pair of impact members operatively positionable along a track system,
   said track system comprises a substantially closed loop configuration,
   a lever assembly wherein said at least one pair of impact members is structured to drivingly engage said lever assembly,
   a gear assembly comprising at least a primary drive gear, said gear assembly disposed to cooperatively associate with said lever assembly,
   said lever assembly further structured to cause movement of at least said primary drive gear, and
   a power generator operably coupled with said gear assembly, said power generator structured to generate usable electrical power.

2. The assembly of claim 1 wherein said track system further comprises a pair of parallel rails.

3. The assembly of claim 2 wherein at least one of said parallel rails include at least one pair of grooves through which said at least one pair of impact members are operatively positionable.

4. The assembly of claim 2 wherein each rail of said parallel rails comprises a plurality of pairs of grooves through which a plurality of pairs of impact members are operatively positionable.

5. The assembly of claim 1 wherein said at least one pair of impact members comprises a first impact member and a second impact member, each of said first and second impact members structured to movably alternate between an extended position and a retracted position.

6. The assembly of claim 5 wherein said first and second impact members are concurrently disposable in different ones of said extended position and said retracted position.

7. The assembly of claim 6 wherein said extended position is at least partially defined by one of said at least one pair of impact members extending outwardly from an outer surface of said track system.

8. The assembly of claim 7 wherein said retracted position is at least partially defined by one of said at least one pair of impact members positioned such that said one impact member is not extending outwardly from said outer surface of said track system.

9. The assembly of claim 1 wherein said at least one pair of impact members comprises a first impact member and a second impact member, each structured to movably alternate between an extended position and a retracted position.

10. The assembly of claim 9 wherein each of said first and second impact members is structured to movably alternate from said extended position to said retracted position upon contact with a flange of a wheel of a vehicle traveling along said track system.

11. An improved energy transfer assembly comprising:
    at least one pair of impact members operatively positionable along a track system,
    said at least one pair of impact members comprises a first impact member and a second impact member, each of said first and second impact members structured to movably alternate between an extended position and a retracted position,
    said first and second impact members are concurrently disposable in different ones of said extended position and said retracted position,
    said extended position is at least partially defined by one of said at least one pair of impact members extending outwardly from an outer surface of said track system,
    said retracted position is at least partially defined by one of said at least one pair of impact members positioned such that said one impact member is not extending outwardly from said outer surface of said track system,
    a lever assembly wherein said at least one pair of impact members is structured to drivingly engage said lever assembly,
    a gear assembly comprising at least a primary drive gear, said gear assembly disposed to cooperatively associate with said lever assembly,
    a drive arm movably interconnecting said lever assembly and said gear assembly, said drive arm alternately disposable between an upstroke orientation and a downstroke orientation,
    said lever assembly further structured to cause movement of at least said primary drive gear, and
    a power generator operably coupled with said gear assembly, said power generator structured to generate usable electrical power.

12. The assembly of claim 11 wherein said extended position of said first impact member is further defined by said drive arm disposed in said upstroke orientation.

13. The assembly of claim 12 wherein said retracted position of said first impact member is further defined by said drive arm disposed in said downstroke orientation.

14. The assembly of claim 13 wherein each of said at least one pair of impact members is structured to movably alternate from said extended position to said retracted position upon contact with a flange of a wheel of a vehicle traveling along said track system.

15. An improved energy transfer assembly comprising:
    at least one pair of impact members operatively positionable along a track system,
    a lever assembly wherein said at least one pair of impact members is structured to drivingly engage said lever assembly,
    a gear assembly comprising at least a primary drive gear, said gear assembly disposed to cooperatively associate with said lever assembly,
    said lever assembly further structured to cause movement of at least said primary drive gear,
    a drive arm structured to movably interconnect said lever assembly to a primary auxiliary gear interconnected and rotational with said primary drive gear, said drive arm is alternately movable between an upstroke orientation and a downstroke orientation, and a power generator operably coupled with said gear assembly, said power generator structured to generate usable electrical power.

16. The assembly of claim 15 wherein the alternation of said drive arm between said upstroke orientation and said downstroke orientation results in rotation of said primary auxiliary gear.

17. The assembly of claim 16 wherein said gear assembly further comprises a transfer drive gear rotationally interconnected to said primary drive gear.

18. The assembly of claim 17 wherein said rotation of said transfer drive gear results in rotation of at least one rotatable component of said power generator.

19. An improved energy transfer assembly comprising:

a track system comprising a substantially closed loop configuration, said track system comprising a pair of parallel rails, at least one pair of impact members including a first impact member and a second- impact member each operatively disposed along said track system and alternately movable between an extended position and a retracted position upon contact with a flange of a wheel of a vehicle traveling along said track system, at least one rail of said pair of rails includes at least one pair of grooves through which said at least one pair of impact members are operatively positionable, a lever assembly interconnected in driving engagement with said at least one pair of impact members, a gear assembly having at least a primary drive gear, said gear assembly disposed to cooperatively associate with said lever assembly, a drive arm movably interconnecting said lever assembly to a primary auxiliary gear, said drive arm structured to cause movement of said primary auxiliary gear, and a power generator rotationally coupled with said gear assembly.

20. The assembly of claim 19 wherein said extended position is at least partially defined by one of said pair of impact members being positioned through one of said pair of grooves in said track system such that at least a portion of said one impact member extends outwardly from an outer surface of said track system.

21. The assembly of claim 20 wherein said retracted position is at least partially defined by one of said pair of impact members being positioned in said groove such that said one impact member is not extending outwardly from said outer surface of said track system.

22. The assembly of claim 21 wherein said drive arm is movably disposable between an upstroke orientation and a downstroke orientation.

23. The assembly of claim 22 wherein said extended position of said first impact member is further defined by said drive arm disposed in said upstroke orientation.

24. The assembly of claim 23 wherein said retracted position of said first impact member is further defined by said drive arm disposed in said downstroke orientation.

25. An improved energy transfer assembly comprising:

a track system comprising a substantially closed loop configuration, said track system comprising a pair of parallel rails, at least one pair of impact members including a first impact member and a second impact member each operatively disposed along said track system and alternately movable between an extended position and a retracted position upon contact with a flange of a wheel of a vehicle traveling along said track system, each rail of said pair of rails comprises a plurality of pairs of grooves, through which a plurality of pairs of impact members are operatively positionable, a lever assembly interconnected in driving engagement with said at least one pair of impact members, a gear assembly having at least a primary drive gear, said gear assembly disposed to cooperatively associate with said lever assembly, a drive arm movably interconnecting said lever assembly to a primary auxiliary gear, said drive arm structured to cause movement of said primary auxiliary gear, and a power generator rotationally coupled with said gear assembly.

26. An improved energy transfer assembly comprising:

a track system comprising a substantially closed loop configuration, at least one pair of impact members including a first impact member and a second impact member each operatively disposed along said track system and alternately movable between an extended position and a retracted position upon contact with a flange of a wheel of a vehicle traveling along said track system, a lever assembly interconnected in driving engagement with said at least one pair of impact members, a gear assembly having at least a primary drive gear, said gear assembly disposed to cooperatively associate with said lever assembly, a drive arm movably interconnecting said lever assembly to a primary auxiliary gear, said drive arm structured to cause movement of said primary auxiliary gear, said drive arm is movably disposable between an upstroke orientation and a downstroke orientation, and a power generator rotationally coupled with said gear assembly.

27. The assembly of claim 26 wherein the disposition of said drive arm between said upstroke orientation and said downstroke orientation results in rotation of said primary auxiliary gear.

28. The assembly of claim 27 wherein said primary drive gear is operably coupled to a transfer drive gear such that said rotation of said primary drive gear results in rotation of said transfer drive gear.

29. The assembly of claim 28 wherein said rotation of said transfer drive gear results in rotation at least one rotatable component of said power.

30. An improved energy transfer assembly utilizing a plurality of wheeled vehicles comprising:

a track system having a circular, substantially closed loop configuration, said track system comprising a pair of parallel rails, the plurality of wheeled vehicles traveling along said track system, each of the plurality of wheeled vehicles comprising a plurality of wheels, wherein each of the plurality of wheels comprises a flange, a plurality of pairs of impact members each having a first impact member and a second impact member, each of said first and second impact members alternately disposed in contacting relation to the flange of one of the plurality of wheels of one of the plurality of wheeled vehicles traveling along said track system, each of said first and second impact members being movable between an extended position and a retracted position, each of said first and second impact members further structured to movably alternate from said extended position to said retracted position upon contact with the flange of one of the plurality of wheels of one of the plurality of wheeled vehicles traveling along said track system, a plurality of lever assemblies wherein each of said plurality of pairs of impact members is structured to drivingly engage a different and corresponding one of said plurality of lever assemblies, a plurality of gear assemblies each having at least a primary drive gear, each of said plurality of gear assemblies disposed to cooperatively associate with a different and corresponding one of said plurality of lever assemblies, a plurality of drive arms structured to movably interconnect one of said plurality of lever assemblies with a primary auxiliary gear of a corresponding one of said plurality of gear assemblies, each of said plurality of drive arms further structured to cause movement of at least said primary auxiliary gear of said corresponding one of said plurality of gear assemblies, and a plurality of power generators each operably coupled with a different one of said plurality of gear assemblies, each of said plurality of power generators structured to generate usable electrical power for transfer to one or more remote locations via a conductor cable.

* * * * *